United States Patent
Fukasawa

(10) Patent No.: US 8,976,403 B2
(45) Date of Patent: Mar. 10, 2015

(54) DOCUMENT PROCESSING SYSTEM, IMAGE FORMING APPARATUS, DOCUMENT PROCESSING METHOD AND COMPUTER READABLE MEDIUM FOR GENERATING A SYNTHETIC IMAGE

(75) Inventor: Hajime Fukasawa, Saitama (JP)

(73) Assignee: Fuji Xerox Co., Ltd., Tokyo (JP)

( * ) Notice: Subject to any disclaimer, the term of this patent is extended or adjusted under 35 U.S.C. 154(b) by 1150 days.

(21) Appl. No.: 12/569,930

(22) Filed: Sep. 30, 2009

(65) Prior Publication Data
US 2010/0231973 A1    Sep. 16, 2010

(30) Foreign Application Priority Data
Mar. 16, 2009 (JP) ................................. 2009-063433

(51) Int. Cl.
*G06F 15/00* (2006.01)
*G06K 1/00* (2006.01)
*G06K 15/00* (2006.01)
*G06F 3/12* (2006.01)
*G06K 15/02* (2006.01)

(52) U.S. Cl.
CPC ..................................... *G06K 15/02* (2013.01)
USPC .......... 358/1.16; 358/1.17; 358/1.13; 358/1.9

(58) Field of Classification Search
None
See application file for complete search history.

(56) References Cited

U.S. PATENT DOCUMENTS

| | | | | |
|---|---|---|---|---|
| 6,832,351 | B1* | 12/2004 | Batres | 715/234 |
| 2002/0032891 | A1* | 3/2002 | Yada et al. | 714/766 |
| 2002/0196479 | A1* | 12/2002 | Simske | 358/474 |
| 2004/0156064 | A1* | 8/2004 | Owen et al. | 358/1.13 |
| 2005/0190394 | A1* | 9/2005 | Ohue | 358/1.13 |
| 2006/0203294 | A1* | 9/2006 | Makino | 358/400 |
| 2006/0274939 | A1 | 12/2006 | Yamada | |
| 2007/0133067 | A1* | 6/2007 | Garg | 358/462 |
| 2008/0055669 | A1* | 3/2008 | Nagarajan et al. | 358/462 |
| 2008/0266610 | A1 | 10/2008 | Suzuki | |

FOREIGN PATENT DOCUMENTS

| | | |
|---|---|---|
| JP | 2007-015370 A | 1/2007 |
| JP | 2007-067859 A | 3/2007 |
| JP | 2007-086899 A | 4/2007 |
| JP | 2008-271418 A | 11/2008 |

OTHER PUBLICATIONS

Japanese Office Action dated Feb. 5, 2013 issued in corresponding Japanese Patent Application No. 2009-063433.

* cited by examiner

*Primary Examiner* — Ming Hon
(74) *Attorney, Agent, or Firm* — Sughrue Mion, PLLC

(57) ABSTRACT

A document processing system includes: a generator that generates a document image to be printed; a memory that stores document images for plural pages, the document images generated by the generator in print processing; an arithmetic unit that performs an AND operation on document images for a plural number of specific pages among the document images stored in the memory; and a display controller that causes a display device to display a synthetic image obtained by the AND operation by the arithmetic unit.

8 Claims, 7 Drawing Sheets

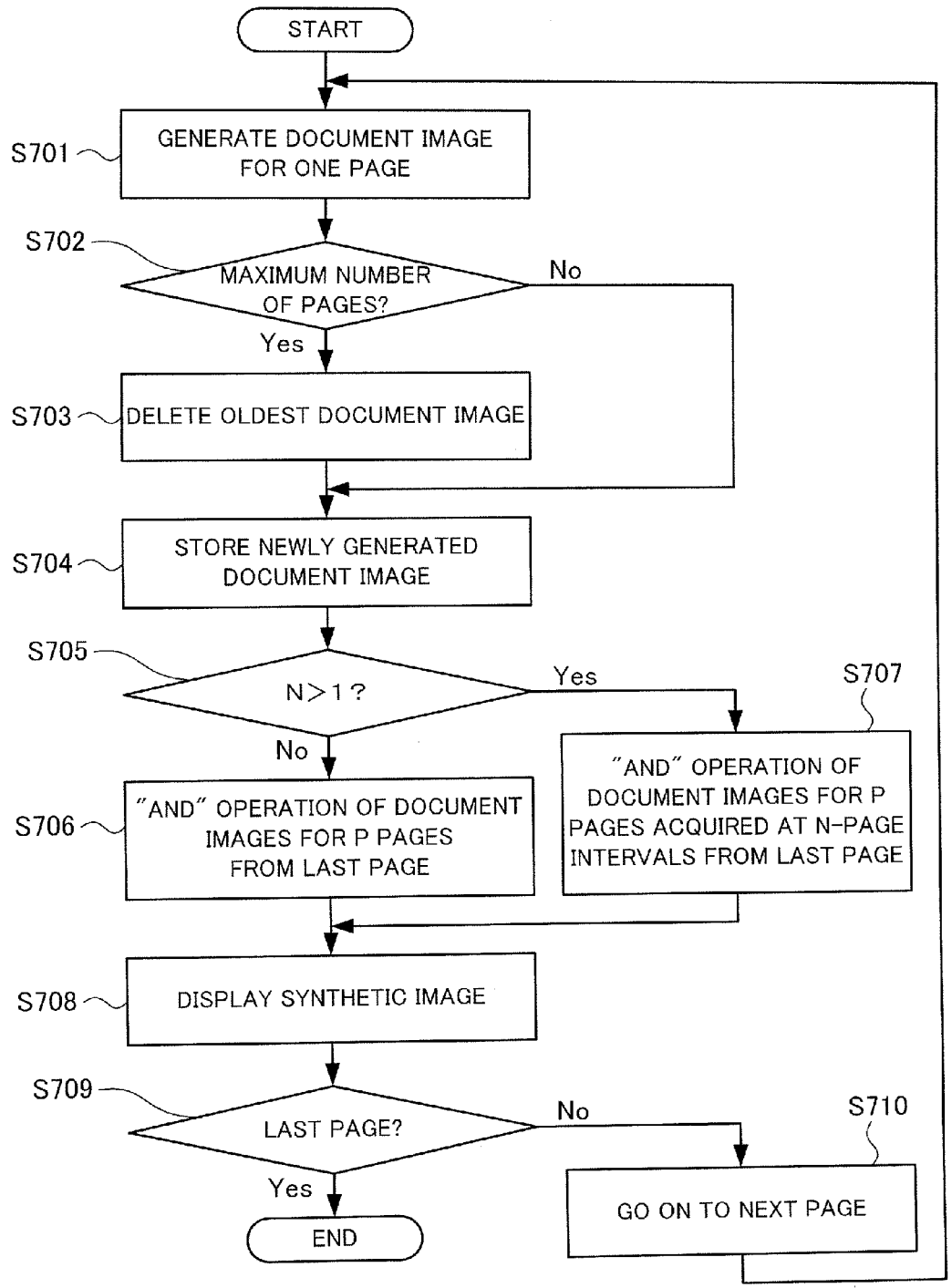

DOCUMENT PROCESSING SYSTEM, IMAGE FORMING APPARATUS, DOCUMENT PROCESSING METHOD AND COMPUTER READABLE MEDIUM FOR GENERATING A SYNTHETIC IMAGE

CROSS REFERENCE TO RELATED APPLICATIONS

This application is based on and claims priority under 35 USC §119 from Japanese Patent Application No. 2009-063433 filed Mar. 16, 2009.

BACKGROUND

1. Technical Field

The present invention relates to a document processing system, an image forming apparatus, a document processing method and a computer readable medium.

2. Related Art

In some cases, while an image forming apparatus is executing a print output job, an operator desires to check the progress of the job or an outputted image. However, in the case of outputting a large number of copies of a document, a large-volume stacker used for stacking outputted sheets makes it structurally difficult to check the sheets stacked in the stacker during the execution of the job. Moreover, the image forming apparatus used for such outputting of a large number of copies of a document prints at a high speed, which makes it difficult for the operator to visually check the images on the outputted sheets during the execution of the job.

SUMMARY

According to an aspect of the present invention, there is provided a document processing system including: a generator that generates a document image to be printed; a memory that stores document images for plural pages, the document images generated by the generator in print processing; an arithmetic unit that performs an AND operation on document images for a plural number of specific pages among the document images stored in the memory; and a display controller that causes a display device to display a synthetic image obtained by the AND operation by the arithmetic unit.

BRIEF DESCRIPTION OF THE DRAWINGS

Exemplary embodiment(s) of the present invention will be described in detail based on the following figures, wherein:

FIG. 7 is a flowchart showing an operation of the controller of the exemplary embodiment.

DETAILED DESCRIPTION

An exemplary embodiment of the present invention will be described in detail with reference to the accompanying drawings.

In the present exemplary embodiment, in an image forming apparatus that performs a mass printout mainly for transactional documents, such as printing bills, detailed statements or direct mails, a document image for checking the progress of a job is displayed on a screen of a display provided in the image forming apparatus. A feature of such a job performed in transactional documents is that, although the forms of pages to be printed are approximately the same, information such as values and texts written in the form is different for each page. By using this feature, the present exemplary embodiment allows the document image to be displayed in the display screen while not allowing detailed information such as personal information to be checked.

Specifically, raster image processor (RIP) output images for several pages are stored, a page image is generated by performing a logical conjunction (AND) operation of the images of the several pages (referred to as an AND image, below), and the AND image is displayed in the display screen. As described above, since the forms of pages used for the job in transactional documents and the like are approximately the same, the forms remain as an image in the AND image and the image is thereby displayed in the display screen. By contrast, since the contents of detailed information such as an address, a name, a charge and a customer number are different for each page, such contents are almost lost by the AND operation. Consequently, only the individual information is illegible in the AND image.

<System Configuration>

Figure 1:
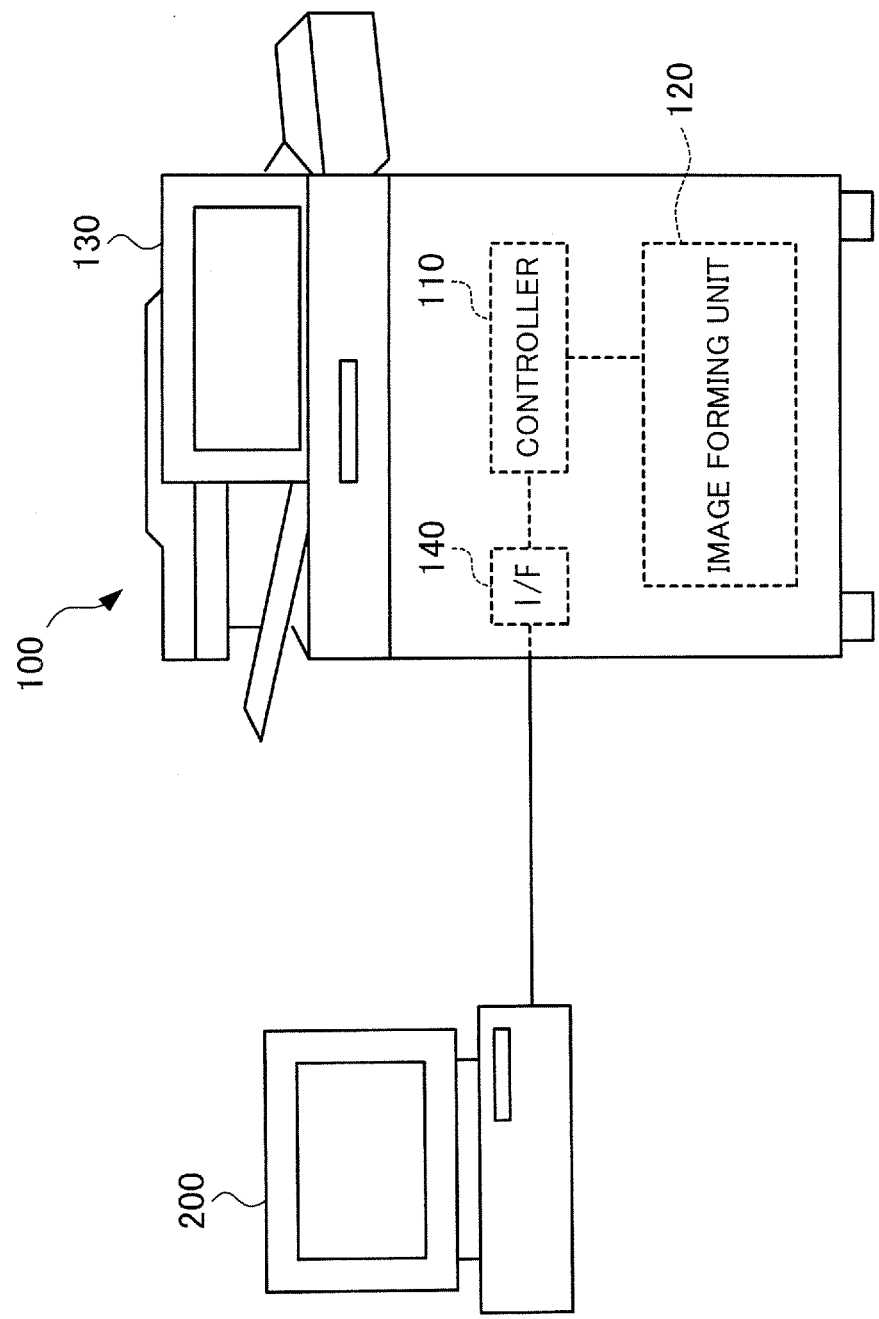
FIG. 1 is a diagram showing a configuration of the image forming apparatus according to the exemplary embodiment.

FIG. 1 is a diagram showing a configuration of the image forming apparatus according to the present exemplary embodiment.

An image forming apparatus 100 shown in FIG. 1 includes a controller 110, an image forming unit 120, a display device 130 and an interface (I/F) 140. The controller 110 controls operations of the apparatus. The image forming unit 120 forms an image on a sheet or the like serving as a medium, by using an image forming material such as toner or ink. The display device 130 displays thereon information on a print setup and the progress of a print job, and the like. The interface 140 exchanges data with an external device such as a personal computer.

The controller 110 is implemented by: a CPU; a ROM in which a program to be executed by the CPU is stored; a RAM serving as a working memory; and the like. The controller 110 controls various processes such as operations of the image forming unit 120, display on the display device 130, and a data exchange through the interface 140, on the basis of a pre-installed program and various settings. Moreover, the controller 110 generates a document image to be printed. Here, the document image is an electronic image of a document to be printed on a medium. Since target documents in the present exemplary embodiment are mainly those used in transactional documents in enterprise printing, the document image is usually an image of a document in a particular format such as a ledger sheet. In addition, although a wording of "document" is used, the contents of the document image are not limited to texts, and may include a picture or a computer graphics image. Further, the contents of the document are not limited to be either color or monochrome.

The image forming unit 120 prints the document image generated by the controller 110, on the medium such as a sheet by using the image forming material such as toner or ink. In the present exemplary embodiment, printing is not limited to any particular method. Accordingly, the image forming unit 120 of the present exemplary embodiment may be configured by any printing unit such as an electrophotographic type unit, an inkjet type unit, or a thermal type unit.

The display device 130 is implemented by a display device such as a liquid crystal display (LCD). On the display device 130, a user interface screen for entering a job execution command or a job setting command, and notifying an operator of the status of a job is displayed, according to the control by the controller 110.

The interface 140 is connected to an external device 200 through a network and the like, and thereby receives a job execution command, document data to be printed and the like from the external device 200 thus connected.

<Functional Configuration of Controller 110>

Figure 2:
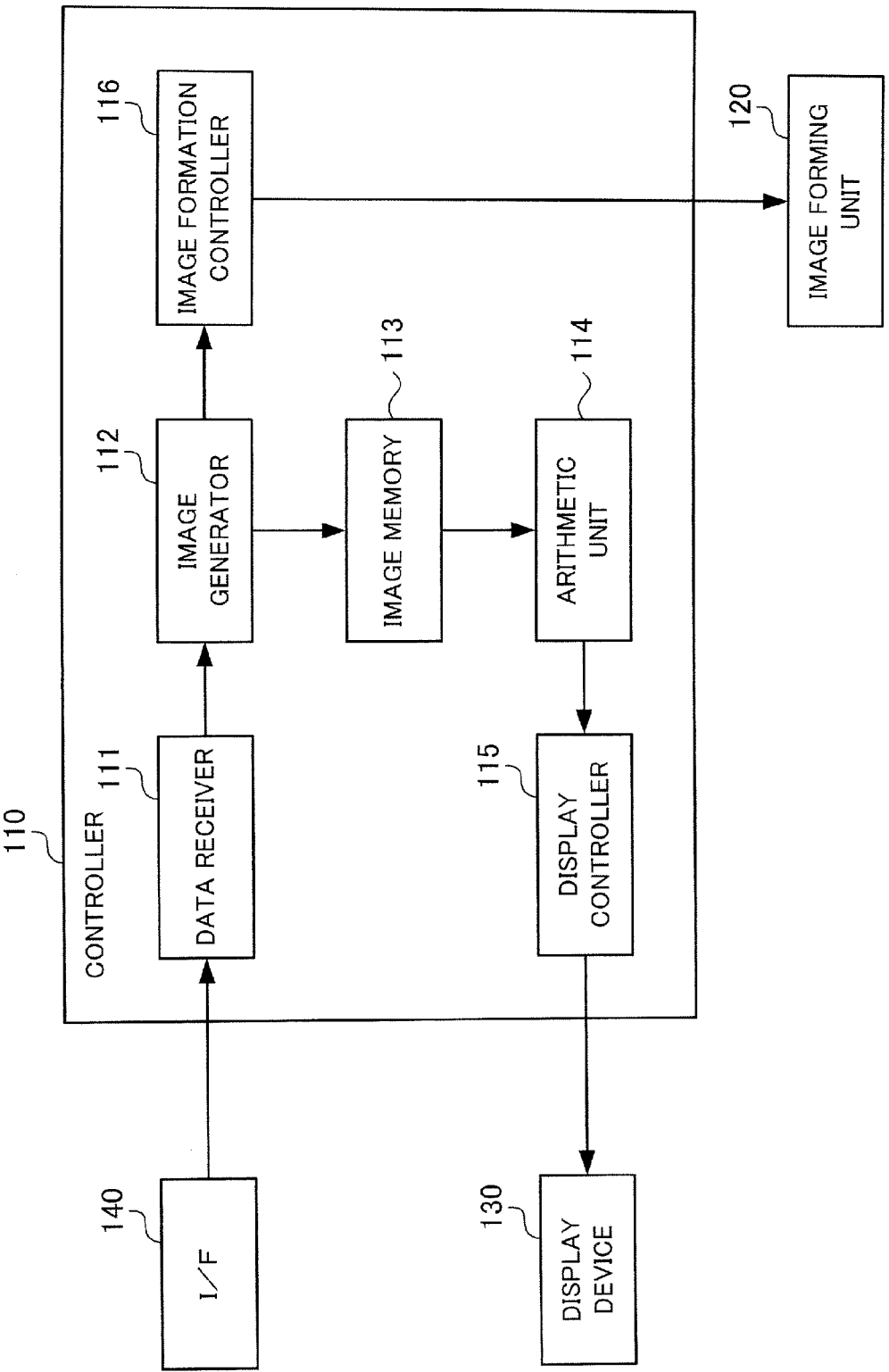
FIG. 2 is a diagram showing a functional configuration of the controller of the exemplary embodiment.

FIG. 2 is a diagram showing a functional configuration of the controller 110.

As shown in FIG. 2, the controller 110 includes a data receiver 111, an image generator 112, an image memory 113, an arithmetic unit 114 and a display controller 115. The controller 110 also includes an image formation controller 116.

The data receiver 111 receives a print job execution command and the document data to be printed, which are received through the interface 140. Here, the document data received from the external apparatus is usually data written in a page description language (PDL). The data receiver 111 transmits the received execution command and document data to the image generator 112.

The image generator 112 is also called a raster image processor (RIP), a decomposer and the like. The image generator 112 analyzes the document data acquired from the data receiver 111 and written in the PDL, and converts the data for each page into a raster image. Then, the image generator 112 transmits the generated document images, which are raster images, to the image generation controller 116 together with the execution command. Here, the document images, which are the raster images, are also transmitted to the image memory 113.

The image memory 113 is implemented by the RAM and the like of the controller 110, and stores therein the document images acquired from the image generator 112. The image memory 113 needs to have a memory capacity large enough to store the document images for several pages. When the data amount of stored document images reaches the upper limit of the data amount storable in the image memory 113, the document images are deleted from the oldest (earliest generated) one to store a document image to be generated next.

The arithmetic unit 114 reads out the document images for several pages stored in the image memory 113, performs an AND operation on the acquired document images, and then generates a synthetic image. Since the document images are raster images, the AND operation is performed for each dot forming each of the images. Specifically, if the dots at the same position in all the document images (pages) have the same pixel value, the pixel value of the dot at this position in the synthetic image is set at the pixel value. On the other hand, if the dots at the same position in the document images have different pixel values, the pixel value of the dot at this position in the synthetic image is set at 0 (blank). Consequently, in the synthetic image, only the element (text or line) at a part where the element is in common among the document images is left while the element at a part where the element is different in each document image is lost. Details of this processing by the arithmetic unit 114 will be described later. The synthetic image obtained by this operation is transmitted to the display controller 115.

The display controller 115 is an output portion that outputs the synthetic image of the document images for the several pages acquired from the arithmetic unit 114. In the configuration shown in FIG. 2, the synthetic image is displayed in a display screen of the display device 130. Display of a synthetic image may be performed every time when a synthetic image is acquired from the arithmetic unit 114, or may be performed when a display instruction is provided by an operation of an operator.

The image formation controller 116 controls the image forming unit 120 on the basis of the execution command and the document images of the raster images to be printed, which are acquired from the image generator 112. Specifically, the image formation controller 116 forms the document images on sheets (media) by using the image forming material, according to the print setup (the number of copies, magnification, color or black-and-white, duplex printing or one-side printing, and the like) of the execution command.

<Details of Processing by Arithmetic Unit 114>

Next, a detailed description will be given of the AND operation processing performed on document images (raster images) by the arithmetic unit 114.

As described above, the arithmetic unit 114 acquires document images for a preset number of pages from the image memory 113, and performs an AND operation on the document images. The acquired document images are document images for the set number of pages sequentially counted back from the page of the document image that is most recently generated by the image generator 112. Here, depending on the structure of the document to be printed (whether the document is one-sided or both-sided, is multiple pages long, and the like), document images may be sequentially acquired for a set number of pages in some cases, while document images may be acquired at several-page intervals for a set number of pages in other cases. In the synthetic image obtained through the AND operation, elements that are in common among all the document images for the multiple pages targeted for the operation are left, while the other elements are lost, as described above. Hereinafter, examples of the document images and the synthetic image will be illustrated.

Figures 3A, 3B:
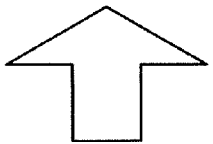
FIGS. 3A and 3B are views showing a state in which document images to be printed are synthesized through an AND operation according to the exemplary embodiment.
Figure 4:
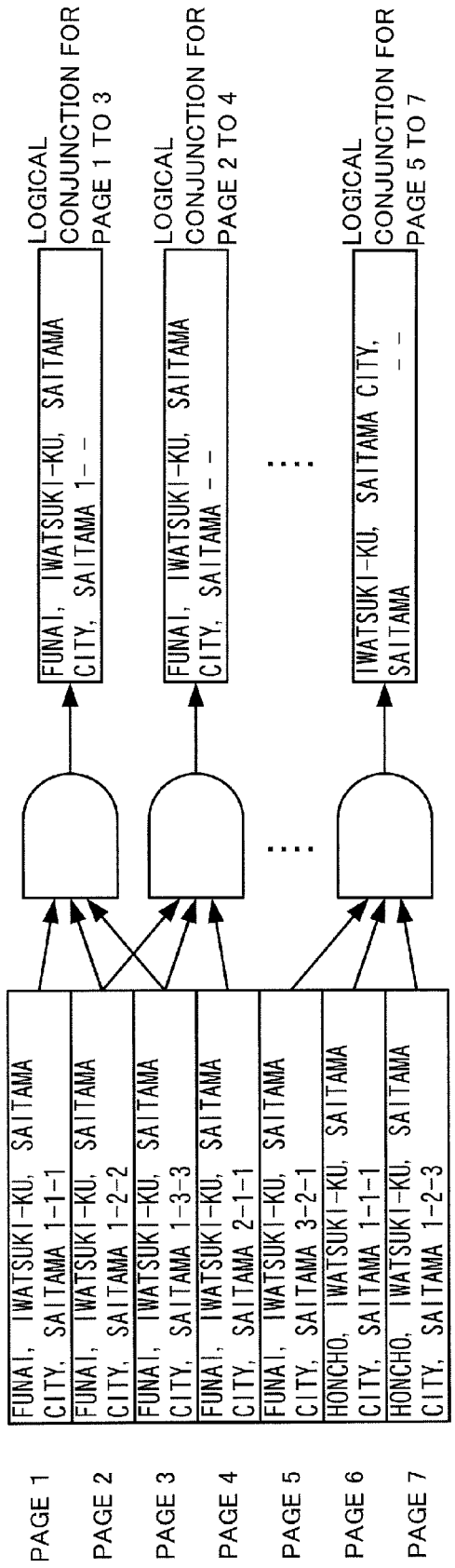
FIG. 4 is a view illustrating a method for the AND operation in FIGS. 3A and 3B.

FIGS. 3A and 3B are views showing a state in which document images to be printed are synthesized through an AND operation according to the present exemplary embodiment. FIG. 4 is a view illustrating a method for the AND operation in FIGS. 3A and 3B.

The present exemplary embodiment is assumed to be used for a print output in transactional documents in enterprise printing. In this case, a large number of copies of a document in the same form, such as ledger sheets, are printed. The outputted documents are in the same form while what is written in the form is different among the documents. For this reason, when a synthetic image is generated by calculating the AND of the document images for multiple pages, only the form and each part of the contents that is in common among the pages are left while each part of the contents that is different among the pages is lost.

A title ("Notification"), a date, an address, a name, a total amount of money and details are written in the form of each document shown in FIG. 3A. Referring to the synthetic image shown in FIG. 3B obtained by calculating the AND of the document images for several pages, the title, the date, a character for a title in a name ("sama"), characters ("total" and "yen") indicating a column in which a total amount of money is written, and the like are left together with the form (layout) common among the documents.

In general, documents of this kind are not arranged completely randomly, but are arranged according to a certain rule, such as the alphabetical order, regarding information written in a certain field for names, addresses or the like. Accordingly, if a part of the address (prefecture name, municipality name, or the like), for example, is in common among the document images for the several pages targeted for an AND operation, the characters of this part remain in the synthetic image without being lost. Hence, by referring to the generated synthetic image, a rough progress state of the print job is found out. Even in this case, more detailed information such as a block number, a name and a telephone number are different from page to page, and are thus lost in the synthetic image.

FIG. 4 shows a state in which AND of parts including information on address is calculated for seven pages of the document shown in FIG. 3A. In the example shown in FIG. 4, the AND of document images for three pages is sequentially calculated by shifting the pages by one. Specifically, first, when the image generator 112 generates the document image of the third page, the document images for three pages counted back from the third page are acquired (stored in the image memory 113), and thus an AND operation is performed on these document images. In FIG. 4, as a result of the AND operation for the first page to the third page, the part "1 Funai, Iwatsuki-ku, Saitama city, Saitama" is in common among these pages, and hence remains. FIG. 3B shows a synthetic image obtained in this case. The description of "1 Funai, Iwatsuki-ku, Saitama city, Saitama" is left in the address field.

Then, the document image of the fourth page is generated, and an AND operation is performed on the document images for three pages counted back from the fourth page, namely, from the second page to the fourth page. The address information in the document image of the fourth page is "2-1-1 Funai, Iwatsuki-ku, Saitama city, Saitama." Accordingly, the part "Funai, Iwatsuki-ku, Saitama city, Saitama" is in common among the pages, and hence remains in a synthetic image. The processing thus advances one page at a time. When the document image of the seventh page is generated, an AND operation is performed on the document images for three pages counted back from the seventh page, namely, from the fifth page to the seventh page. The part "Iwatsuki-ku, Saitama city, Saitama" is in common among these pages, and hence remains in the synthetic image. Subsequently, every time the image generator 112 generates the document image of the following page, the document images for three pages counted back from the most recently generated document image are acquired in sequence, and an AND operation on these document images is performed.

A synthetic image lacking of detailed information that is unique to each page such as an address is thus created, and is displayed on the display device 130 under the control by the display controller 115. As described above, although lacking detailed information included in each page, the synthetic image includes information that is in common among the document images for the pages targeted for the AND operation. In the example shown in FIGS. 3A to 4, the synthetic image includes the prefecture name, municipality name, and the like of the address information. Specifically, the synthetic image includes information to some extent, according to the rule used for arranging the document pages. Hence, information included in the synthetic image roughly reflects the progress state of the print job.

Incidentally, a document to be printed is both-sided in some cases, while continuing for multiple pages in other cases. In such a case, the document images on a front side and aback side, or the document images of the respective pages of a single document are often different. Accordingly, if an AND operation is performed on the document images for multiple continuous pages as described above with reference to FIGS. 3A to 4, the document images may have no common part, which results in generating an empty (blank) synthetic image. For this reason, in such a case, the arithmetic unit 114 acquires document images for a set number of pages counted back from the most recently generated document image at several-page intervals, when acquiring document images targeted for an AND operation. The intervals for acquiring document images need to be set when an operator enters a print job execution command, since the intervals vary according to the structure of the documents to be printed.

Figures 5A, 5B:
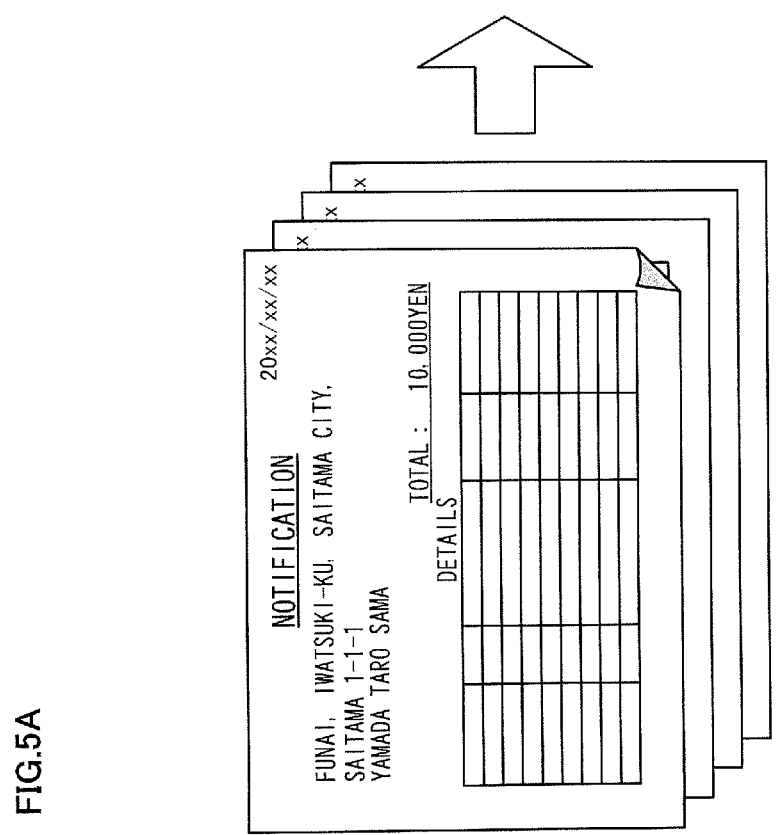
FIGS. 5A and 5B are views showing a state in which document images are synthesized through an AND operation when documents to be printed are both-sided.
Figure 6:
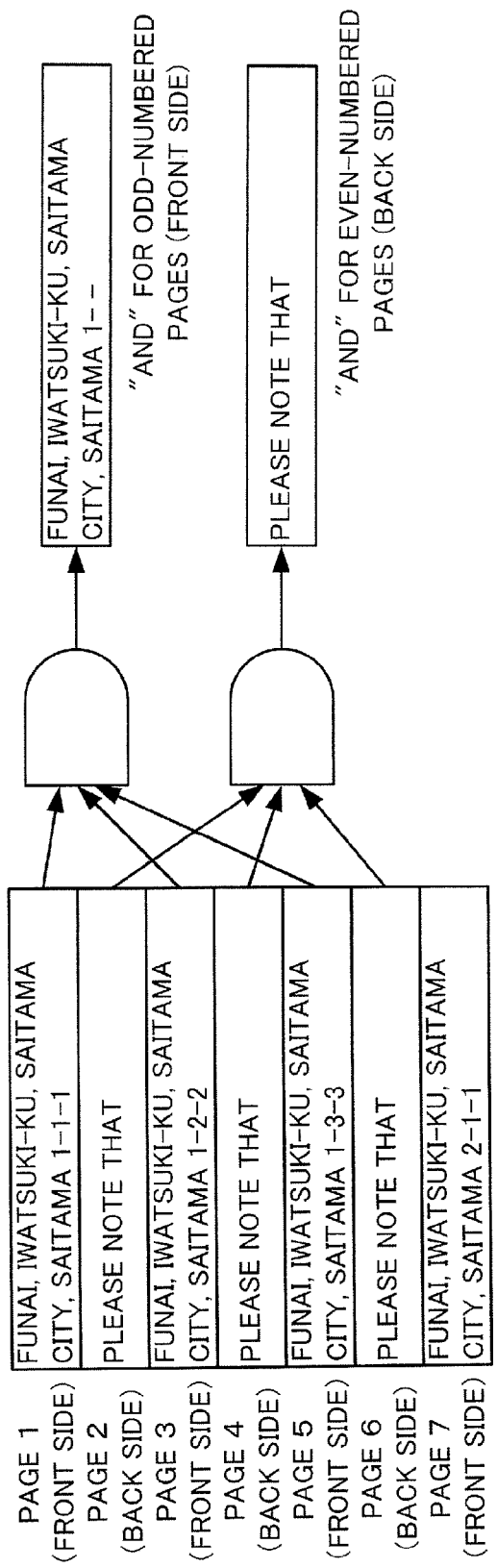
FIG. 6 is a view illustrating a method for the AND operation in FIGS. 5A and 5B.

FIGS. 5A and 5B are views showing a state in which document images are synthesized through an AND operation when documents to be printed are both-sided. FIG. 6 is a view illustrating a method for the AND operation in FIGS. 5A and 5B.

Each document shown in FIGS. 5A and 5B is both-sided, and only the pages of the front sides are shown in FIG. 5A. The document images of the front sides shown in FIG. 5A have the same structure as the document images shown in FIG. 3A. To the pages of the unillustrated back sides, descriptive texts that are different from page to page are written. Meanwhile, the text "Please note that" in the second line of the main body is assumed to be in common among the pages due to the layout of the document.

FIG. 6 shows a state in which AND is calculated for seven pages of the document shown in FIG. 5A. Since each document to be printed is both-sided in this example, odd-numbered pages are on the front sides, and even-numbered pages are on the back sides. Accordingly, in this example, the AND of the document images for three pages corresponding to every other page is calculated. Specifically, first, when the image generator 112 generates the document image of the fifth page, the document images for three pages counted back from the fifth page for every other page (first, third and fifth pages) are acquired, and thus an AND operation is performed on these document images (front sides). The result of the AND operation for the first, third and fifth pages in FIG. 6 is the same as that of the AND operation for the first to third pages in the example in FIG. 4. The part "1 Funai, Iwatsuki-ku, Saitama city, Saitama" is in common among the pages, and thus remains in the synthetic image.

Then, when the document image of the sixth page is generated, the document images for three pages counted back from the sixth page for every other page (second, fourth and sixth pages) are acquired, and thus an AND operation is performed on these document images (back sides). As described above, only the part "Please note that" in the second line is in common among the document images of the pages on the back sides, and thus remains in the synthetic image. In addition, if parts of the document are coincidentally in common among the document images for three pages, the parts also remain in the synthetic image.

Subsequently, the result of an AND operation targeting document images on front sides and the result of an AND operation targeting document images on back sides are alternately obtained. FIG. 5B shows a front-side document image and a back-side document image obtained as results of the AND operations targeting the document images from the first to sixth pages. Although a description has been given of a case where each document to be printed is both-sided (each document is two pages long) in the example shown in FIGS. 5A to 6, processing based on the same idea is performable for documents each being three or more pages long. Specifically, when a document is N pages long, document images are acquired for a set number of pages (three pages in the above example) at N-page intervals, and an AND operation is performed on the acquired document images.

Here, in displaying synthetic images of documents each being multiple pages long, the pages may be sequentially displayed, or may be arranged in a row and concurrently displayed, in the display screen of the display device 130. Further, although the document image of each page is targeted for an AND operation to generate a synthetic image in the above examples, an AND operation may be performed only on the document images of specific pages (for example, pages of the front sides, front pages or the like) to generate a synthetic image.

Moreover, color printing is different from black-and-white printing in that each dot of a raster image is represented by one bit in black-and-white printing while being represented by multiple bits on multiple (CMYK) in color printing. However, the same effect as in black-and-white printing is obtainable in color printing by performing an AND operation separately for each of the channels C, M, Y and K.

<Flow of Processing by Controller 110>

Next, a description will be given of a flow of the entire processing performed by the controller 110.

FIG. 7 is a flowchart showing an operation of the controller 110. It is to be noted that the flowchart shown in FIG. 7 only includes processing related to the AND operation for document images and the display of a synthetic image according to the present exemplary embodiment and that the flowchart does not include processing for printing and outputting document images performed by the image formation controller 116 (print job execution).

When a print job is started, the image generator 112 of the controller 110 generates a document image for one page (the first page, initially) first (Step 701). The generated document image is transmitted to the image memory 113. Here, although not shown in the flowchart, this document image is also transmitted to the image formation controller 116 to execute the print job.

When acquiring the document image from the image generator 112, the image memory 113 judges whether or not the number of pages of the document images stored therein has reached the maximum storable number of pages (within a memory capacity) (Step 702). If the number of pages has not reached the maximum number, the image memory 113 stores the newly-generated document image (Step 704). On the other hand, if the number of pages has reached the maximum number, the image memory 113 first deletes the oldest document image (Step 703) and then stores the newly generated document image (Step 704). Here, in consideration of generating synthetic images for each page of documents being multiple pages long, the image memory 113 needs to have a memory capacity corresponding to the number of pages that is several times larger than the number P of pages targeted for AND operations.

Thereafter, the arithmetic unit 114 judges whether or not the number N of pages of each document to be printed is larger than one. If N=1 (No in Step 705), the arithmetic unit 114 acquires document images for P pages sequentially counted back from the most-recently generated document image (the document image of the new page), and then performs an AND operation on the acquired document images (Step 706). On the other hand, if N>1 (Yes in Step 705), the arithmetic unit 114 acquires document images for P pages counted back from the most recently generated document image (the document image of the new page) at N-page intervals, and then performs an AND operation on the acquired document images (Step 707).

Subsequently, the display controller 115 displays the synthetic image generated through the AND operation by the arithmetic unit 114, in the display screen of the display device 130 (Step 708). If the document image generated in Step 701 is that of the last page in this print job (Yes in Step 709), a document image is not generated any more. Accordingly, the controller 110 terminates the processing. On the other hand, if the document image generated in Step 701 is not that of the last page in this print job (No in Step 709), the controller 110 sets the next page as a processing target (Step 710), and returns to Step 701 to repeat the above processing.

Hereinabove, the present exemplary embodiment has been described. However, the technical scope of the present invention is not limited to the scope described in the above exemplary embodiment. For example, in the above exemplary embodiment, a synthetic image generated through an AND operation by the arithmetic unit 114 is displayed on the display device 130 of the image forming apparatus 100. However, the synthetic image may be outputted to an external apparatus and thereby displayed on a display device of the external apparatus. Moreover, the synthetic image may be transmitted to the image formation controller 116 to cause the image forming unit 120 to form an image on a medium and output the image, and may be then used as a sample image for checking of image quality and the like. Alternatively, instead of the synthetic image, the document images themselves targeted for the AND operations performed by the arithmetic unit 114 may be transmitted to the image formation controller 116 to cause the image forming unit 120 to form an image on a medium and output the image, and may be then used as a sample image for checking image quality and the like. In addition, modified forms and improved forms of the above exemplary embodiment are also within the technical scope of the present invention.

The foregoing description of the exemplary embodiments of the present invention has been provided for the purposes of illustration and description. It is not intended to be exhaustive or to limit the invention to the precise forms disclosed. Obviously, many modifications and variations will be apparent to practitioners skilled in the art. The exemplary embodiments were chosen and described in order to best explain the principles of the invention and its practical applications, thereby enabling others skilled in the art to understand the invention for various embodiments and with the various modifications as are suited to the particular use contemplated. It is intended that the scope of the invention be defined by the following claims and their equivalents.

What is claimed is:

1. A document processing system comprising:
   a generator that generates a document image to be printed;
   a memory that stores document images for a plurality of pages, the document images generated by the generator in print processing and being double-sided or continuing for multiple pages;
   a number of pages setting unit that sets page intervals at which document images are acquired for a set number of pages;
   a document image acquiring unit that acquires document images for the set number of pages set by the number of pages setting unit at the set page intervals;
   an arithmetic unit that performs an AND operation on document images acquired by the document image acquiring unit from the document images stored in the memory; and a display controller that causes a display device to display a synthetic image obtained by the AND operation by the arithmetic unit, wherein:

the document images generated by the generator in print processing correspond to a plurality of documents, the page intervals set by the number of pages setting unit correspond to a number of pages in each document in the plurality of documents, and the document images acquired by the document image acquiring unit are document images acquired every nth page from the document images stored in the memory, where n=the page intervals set by the number of pages setting unit.

2. The document processing system according to claim 1, wherein, upon receipt of an instruction to display the synthetic image, the display controller acquires the synthetic image from the arithmetic unit and causes the display device to display the synthetic image thus acquired.

3. The document processing system according to claim 1, wherein the AND operation performed by the arithmetic unit comprises:

when dots at a same position in each of the document images for the number of specific pages have a same pixel value, a pixel value of a dot at the same position in the synthetic image is set at the same pixel value; and when the dots at the same position in each of the document images for the number of specific pages have different pixel values, the pixel value of the dot at the same position in the synthetic image is set to a blank value.

4. An image forming apparatus comprising:

an image forming unit that forms a document image on a medium by using an image forming material in print processing;

a generator that generates the document image in the print processing;

a memory that stores document images for a plurality of pages, the document images generated by the generator and being double-sided or continuing for multiple pages;

a number of pages setting unit that sets page intervals at which document images are acquired for a set number of pages;

a document image acquiring unit that acquires document images for the set number of pages set by the number of pages setting unit at the set page intervals;

an arithmetic unit that performs an AND operation on document images acquired by the document image acquiring unit from the document images stored in the memory;

a display that displays a synthetic image obtained by the AND operation by the arithmetic unit; and an output unit that causes the image forming unit to form and output the synthetic image obtained by the AND operation by the arithmetic unit, wherein:

the document images generated by the generator in print processing correspond to a plurality of documents, the page intervals set by the number of pages setting unit correspond to a number of pages in each document in the plurality of documents, and the document images acquired by the document image acquiring unit are document images acquired every nth page from the document images stored in the memory, where n=the page intervals set by the number of pages setting unit.

5. The image forming apparatus according to claim 4, wherein the image forming unit forms the synthetic image on a medium apart from the print processing, the synthetic image obtained by the AND operation by the arithmetic unit.

6. The image forming apparatus according to claim 4, wherein the image forming unit forms a document image on a medium apart from the print processing as a sample image, the document image generated most recently among the document images targeted for the AND operation by the arithmetic unit.

7. A document processing method for a document processing system comprising:

generating document images to be printed;

storing the document images for a plurality of pages, the document images generated in print processing and being double-sided or continuing for multiple pages;

setting page intervals at which document images are acquired for a set number of pages;

acquiring document images for the set number of pages at the set page intervals;

performing an AND operation on document images acquired from the document images thus stored; and causing a display device to display a synthetic image obtained by the AND operation, wherein:

the document images generated in print processing correspond to a plurality of documents, the set page intervals correspond to a number of pages in each document in the plurality of documents, and the acquired document images are document images acquired every nth page from the stored document images, where n=the set page intervals.

8. A non-transitory computer readable medium storing a program that causes a computer to execute a process for controlling an image forming apparatus, the process comprising:

generating document images to be printed;

storing the document images in a storage for a plurality of pages, the document images generated in print processing and being double-sided or continuing for multiple pages;

setting page intervals at which document images are acquired for a set number of pages;

acquiring document images for the set number of pages at the set page intervals;

performing an AND operation on document images acquired from the document images stored in the storage; and causing a display device to display a synthetic image obtained by the AND operation, wherein:

the document images generated in print processing correspond to a plurality of documents, the set page intervals correspond to a number of pages in each document in the plurality of documents, and the acquired document images are document images acquired every nth page from the stored document images, where n=the set page intervals.

* * * * *